(12) United States Patent
Shin et al.

(10) Patent No.: US 10,063,719 B2
(45) Date of Patent: Aug. 28, 2018

(54) IMAGE FORMING APPARATUS, GUIDE PROVIDING METHOD THEREOF, CLOUD SERVER, AND ERROR ANALYZING METHOD THEREOF

(71) Applicant: S-PRINTING SOLUTION CO., LTD., Suwon-si, Gyeonggi-do (KR)

(72) Inventors: Jeong-hwan Shin, Yongin (KR); Chang-hyung Lee, Seoul (KR); Dong-hyeop Han, Yongin (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 15/196,773

(22) Filed: Jun. 29, 2016

(65) Prior Publication Data
US 2017/0187897 A1 Jun. 29, 2017

(30) Foreign Application Priority Data
Dec. 24, 2015 (KR) .......................... 10-2015-0186462

(51) Int. Cl.
*H04N 1/00* (2006.01)
*H04N 1/32* (2006.01)
(Continued)

(52) U.S. Cl.
CPC ....... *H04N 1/00344* (2013.01); *G06F 3/1288* (2013.01); *G06F 3/1292* (2013.01); *G06F 3/1294* (2013.01); *G06F 9/4446* (2013.01); *G06F 9/453* (2018.02); *G06F 11/006* (2013.01); *G06K 9/18* (2013.01); *G06K 15/408* (2013.01); *H04N 1/0005* (2013.01);
(Continued)

(58) Field of Classification Search
None
See application file for complete search history.

(56) References Cited

U.S. PATENT DOCUMENTS 5,365,310 A 11/1994 Jenkins
6,205,239 B1 * 3/2001 Lin .................. G01N 21/95607
257/E21.525
(Continued)

FOREIGN PATENT DOCUMENTS

JP 2001-245091 9/2001
JP 2003-94783 4/2003
(Continued)

OTHER PUBLICATIONS

Extended European Search Report dated May 4, 2017 in corresponding European Patent Application No. 16 17 9078.

*Primary Examiner* — Beniyam Menberu
(74) *Attorney, Agent, or Firm* — Staas & Halsey LLP

(57) ABSTRACT

An image forming apparatus, guide providing method thereof, cloud server and error analyzing method thereof are provided. The image forming apparatus may include a scanner configured to scan a script and generate a scan image, a communicator configured to communicate with a cloud server, a display configured display a screen, and a processor configured to control the communicator to transmit the generated scan image to a cloud server, and in response to receiving an error solution guide of the scan image from the cloud server, control the display to display the received error solution guide.

15 Claims, 19 Drawing Sheets

(51) Int. Cl.
*G06F 3/12* (2006.01)
*G06K 15/02* (2006.01)
*G06F 11/00* (2006.01)
*G06F 9/451* (2018.01)
*G06K 9/18* (2006.01)
*G06K 15/00* (2006.01)
*G06F 9/44* (2018.01)

(52) U.S. Cl.
CPC ..... *H04N 1/00005* (2013.01); *H04N 1/00013* (2013.01); *H04N 1/00015* (2013.01); *H04N 1/00039* (2013.01); *H04N 1/00042* (2013.01); *H04N 1/00047* (2013.01); *H04N 1/00061* (2013.01); *H04N 1/00074* (2013.01); *H04N 1/0084* (2013.01); *H04N 1/00084* (2013.01); *H04N 1/00222* (2013.01); *H04N 1/00244* (2013.01); *H04N 1/00408* (2013.01); *H04N 1/00411* (2013.01); *H04N 1/00424* (2013.01); *H04N 1/00427* (2013.01); *H04N 1/00448* (2013.01); *H04N 1/00461* (2013.01); *H04N 1/00474* (2013.01); *H04N 1/00798* (2013.01); *H04N 1/00811* (2013.01); *H04N 1/00824* (2013.01); *H04N 1/00872* (2013.01); *H04N 1/3263* (2013.01); *H04N 1/32635* (2013.01); *H04N 1/32651* (2013.01); *H04N 1/32673* (2013.01); *H04N 2201/0081* (2013.01); *H04N 2201/0094* (2013.01)

(56) References Cited

U.S. PATENT DOCUMENTS

| | | | |
|---|---|---|---|
| 6,665,425 B1 | 12/2003 | Sampath et al. | |
| 9,235,819 B2 | 1/2016 | Torii et al. | |
| 9,473,651 B2* | 10/2016 | Zahoran | H04N 1/00408 |
| 9,615,810 B2* | 4/2017 | Matsuno | A61B 6/563 |
| 9,760,786 B2* | 9/2017 | Sahagun | G06K 9/033 |
| 2002/0139943 A1 | 10/2002 | Matama | |
| 2003/0039403 A1 | 2/2003 | Robins | |
| 2003/0076518 A1 | 4/2003 | Miyake et al. | |
| 2003/0076523 A1 | 4/2003 | Ito et al. | |
| 2005/0012967 A1* | 1/2005 | Okamura | H04N 1/00681 |
| | | | 358/474 |
| 2005/0238205 A1 | 10/2005 | Kimura et al. | |
| 2006/0033967 A1* | 2/2006 | Brunner | G06K 9/00469 |
| | | | 358/474 |
| 2006/0239394 A1* | 10/2006 | Fujieda | G01N 23/04 |
| | | | 378/1 |
| 2007/0076240 A1 | 4/2007 | Ogura | |
| 2008/0240608 A1* | 10/2008 | Ishii | G06T 5/005 |
| | | | 382/275 |
| 2008/0263404 A1 | 10/2008 | Vidiyala | |
| 2009/0185204 A1* | 7/2009 | Wu | H04N 1/60 |
| | | | 358/1.9 |
| 2009/0199041 A1* | 8/2009 | Fukui | G06F 11/2082 |
| | | | 714/6.12 |
| 2009/0201538 A1* | 8/2009 | Ishikawa | H04N 1/00846 |
| | | | 358/1.15 |
| 2010/0325490 A1* | 12/2010 | Anvin | G06F 11/0748 |
| | | | 714/37 |
| 2011/0044529 A1* | 2/2011 | Tsuchiya | G01N 21/95607 |
| | | | 382/144 |
| 2012/0140284 A1 | 6/2012 | Tashiro et al. | |
| 2012/0200874 A1* | 8/2012 | Kohara | G03G 15/5016 |
| | | | 358/1.12 |
| 2013/0021641 A1* | 1/2013 | Park | G06F 3/121 |
| | | | 358/1.14 |
| 2013/0114100 A1* | 5/2013 | Torii | G06F 11/0733 |
| | | | 358/1.14 |
| 2013/0117267 A1 | 5/2013 | Buryak et al. | |
| 2013/0182293 A1 | 7/2013 | Okada et al. | |
| 2013/0215469 A1 | 8/2013 | Pizot et al. | |
| 2013/0335758 A1* | 12/2013 | Torii | G06F 3/1294 |
| | | | 358/1.9 |
| 2014/0111834 A1 | 4/2014 | Fallon et al. | |
| 2014/0168733 A1 | 6/2014 | Schaertel et al. | |
| 2014/0204403 A1* | 7/2014 | Young | G06F 3/1293 |
| | | | 358/1.14 |
| 2014/0218763 A1 | 8/2014 | Takahashi et al. | |
| 2014/0270397 A1 | 9/2014 | Sochi | |
| 2015/0109453 A1 | 4/2015 | Horiyama | |
| 2015/0146264 A1* | 5/2015 | Ikari | H04N 1/00005 |
| | | | 358/406 |
| 2015/0365542 A1 | 12/2015 | Kim et al. | |
| 2016/0187828 A1* | 6/2016 | Fukami | G03G 15/502 |
| | | | 399/81 |
| 2016/0191318 A1* | 6/2016 | Neilson | H04L 41/0869 |
| | | | 709/220 |

FOREIGN PATENT DOCUMENTS

| | | |
|---|---|---|
| JP | 2004-248081 | 9/2004 |
| JP | 2005-178170 | 7/2005 |
| JP | 2012-96448 | 5/2012 |
| JP | 2013-62602 | 4/2013 |
| JP | 2013-140563 | 7/2013 |
| JP | 2015-80895 | 4/2015 |

* cited by examiner

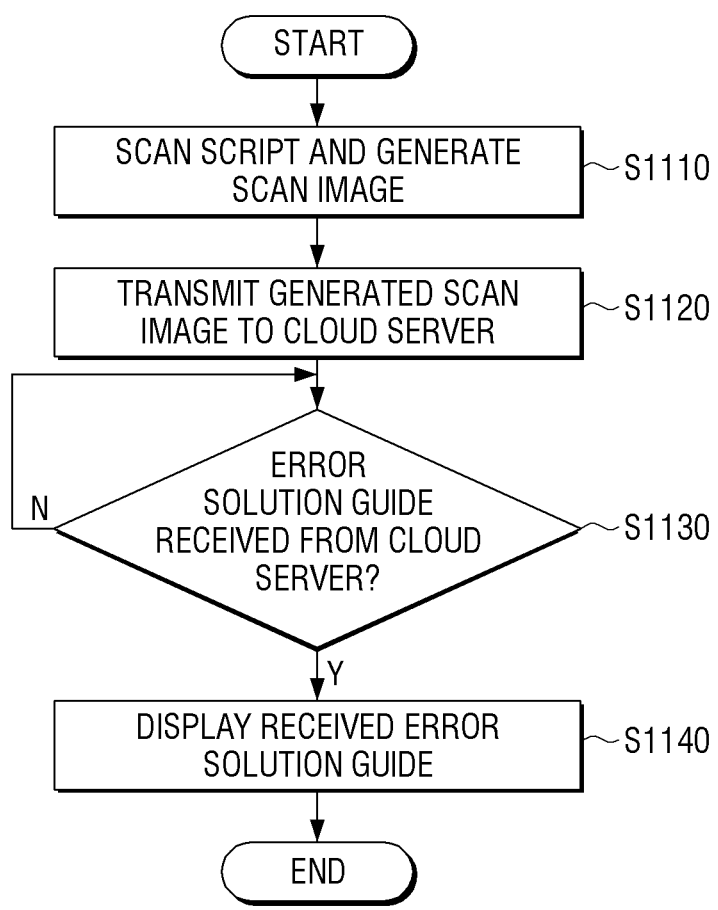

IMAGE FORMING APPARATUS, GUIDE PROVIDING METHOD THEREOF, CLOUD SERVER, AND ERROR ANALYZING METHOD THEREOF

CROSS-REFERENCE TO RELATED APPLICATION(S)

This application claims the priority benefit under 35 U.S.C. § 119(a) of Korean patent application, filed on Dec. 24, 2015 in the Korean Intellectual Property Office and assigned Serial Number 10-2015-0186462, the entire disclosure of which is hereby incorporated by reference.

BACKGROUND

1. Field

The present disclosure relates to an image forming apparatus, a guide providing method thereof, a cloud server, and an error analyzing method thereof. More particularly, the present disclosure relates to an image forming apparatus in which the cloud server performs analysis of an error in an output of the image forming apparatus and in which the image forming apparatus may provide an error solution guide to a user, a guide providing method thereof, a cloud server, and an error analyzing method thereof.

2. Description of the Related Art

When an error occurs in an output of an image forming apparatus, conventionally, a user had to determine by themselves a cause for the error or find a solution to the error by calling a technician at a service center. However, such method involves a user inconvenience, and thus, a demand for automation in determining an error occurring in an image forming apparatus has been increased.

Accordingly, to identify a defect in an image, the technique of printing a test pattern and scanning the printed test pattern was proposed. However, when a degradation of picture quality is determined, additionally designated test pattern had to re-output by a user and thus, a user convenience is degraded and consumption of consumables is increased.

In addition, diagnostic inference engine is mounted in or provided in the form of a PC driver, an image forming apparatus and thus, there is a limit to the resources that may be used. In addition, an update of diagnostic inference engine and a management of a new form of error need to be respectively updated per image forming apparatus of a user and thus, a problem occurs in terms of integrated management and management efficiency.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an image forming apparatus, a guide providing method thereof, a cloud server and an error analysis method thereof, which may provide the accurate diagnosis of a low picture quality of the image forming apparatus and a guide as to how to deal with such problem and improve a user convenience.

In accordance with an aspect of the present disclosure, an image forming apparatus is provided. The image forming apparatus may include a scanner configured to scan a script and generate a scan image, a communicator configured to communicate with a cloud server, a display configured to display a screen, and a processor configured to control the communicator to transmit the generated scan image to the cloud server, and in response to receiving an error solution guide of the scan image from the cloud server, control the display to display the received error solution guide.

According to an embodiment of the present disclosure, a cloud server may include a communicator configured to communicate with an image forming apparatus, a storage configured to store a parameter for error analysis and a plurality of error solution guides, and a processor configured to, in response to receiving a scan image from the image forming apparatus, analyze the scan image and determine an error, retrieve at least one error solution guide corresponding to the determined error from among the stored plurality of error solution guides, and control the communicator to transmit the retrieved at least one error solution guide to the image forming apparatus.

According to an embodiment of the present disclosure, a method for providing a guide by an image forming apparatus may include generating a scan image by scanning a script, transmitting the generated scan image to a cloud server, and in response to receiving an error solution guide of the scan image from the cloud server, displaying the received error solution guide.

According to an embodiment of the present disclosure, a method for analyzing errors by a cloud server may include, in response to receiving a scan image from an image forming apparatus, analyzing the scan image and determining an error, retrieving at least one error solution guide corresponding to the determined error from among a plurality of pre-stored error solution guides, and transmitting the retrieved at least one error solution guide to the image forming apparatus.

In accordance with the various embodiments of the present disclosure, a cause for an occurred error may be analyzed by a cloud server and a guide to solution thereof may be provided by an image forming apparatus, by means of an actual output from the image forming apparatus.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain exemplary embodiments of the present disclosure will be more apparent from the following description taken in conjunction with the accompanying drawings.

FIGS. 11 and 12 are flowcharts provided to explain a guide providing method of an image forming apparatus according to various embodiments of the present disclosure.

Throughout the drawings, like reference numerals will be understood to refer to like parts, components, and structures.

DETAILED DESCRIPTION

Hereinafter, the present disclosure will be described in detail with reference to the accompanying drawings. In the following description, well-known functions or constructions are not described in detail since they would obscure the application with unnecessary detail. The terms used in an embodiment of the disclosure are defined in view of function with respect to the disclosure; however, the terms may vary according to a technician, operator, custom, or the like. Accordingly, the terms used in the description should be defined based on overall contents of the present disclosure.

In the present disclosure, relational terms such as first and second, and the like, may be used to distinguish one entity from another entity, without necessarily implying any actual relationship or order between such entities. For example, a first component may be called a second component without departing from the scope and spirit of the present disclosure. The term "and/or" includes any one item from among the combination of a plurality of related items or a plurality of related items.

The terms used in following description are provided to explain various embodiments and are not intended to limit the scope of rights. A singular term includes a plural form unless it is intentionally written that way. The terms, "include" or "comprise" of the description are used to indicate the existence of features, numbers, operations, elements, parts or combination thereof, and do not exclude the possibilities of combination or addition of one or more features, numbers, steps, operations, elements, parts or combination thereof.

Figure 1:
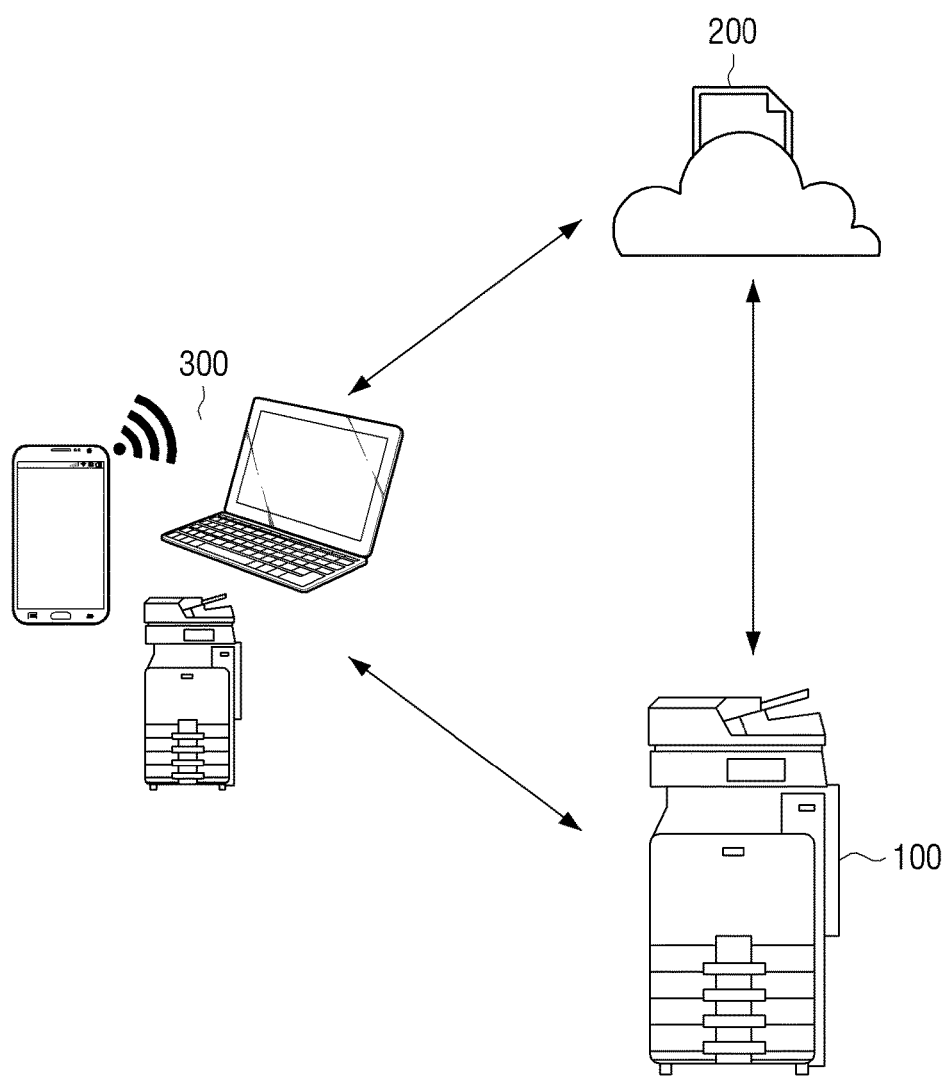
FIG. 1 is a concept map provided to explain a concept of the present disclosure.

FIG. 1 is a view provided to explain the concept of the present disclosure. According to an embodiment of the present disclosure, when an image of output of an image forming apparatus 100 is significantly different from an original script, or has a low picture quality, the image forming apparatus may transmit a scan image generated by scanning an actual output to the cloud server 200.

The image forming apparatus 100 may display an error solution guide provided from a cloud server 200. The image forming apparatus 100 may transmit feedback information on whether a generated image error has been resolved by the provided error solution guide to the cloud server 200.

The image forming apparatus 100 may be realized as a scanner, a copy machine, a printer, a facsimile, or a multi function peripheral (MPF) which comprehensively realizes the functions thereof through one device.

The cloud server 200 may determine a cause for error occurred in the image forming apparatus 100 by means of a stored analysis program. The cloud server 200 may provide a guide that can provide solutions to the error to the image forming apparatus 100.

The image forming apparatus 100 may not communicate with the cloud server 200, or may not generate a scan image generated by scanning an output due to the absence of scanning function. The image forming apparatus 100 may not find an error solution guide. In this case, a user may be provided with an error solution guide from an external auxiliary device 300. For example, the external auxiliary device 300 may, for example, be a mobile device such as a smartphone, a notebook, a desktop computer, and another image forming apparatus having a scanning function and a communication function, or the like.

The external auxiliary device 300 may generate image data with respect to an output of the image forming apparatus 100 by means of a camera function or a scanning function. The external auxiliary device 300 may transmit the generated image data to the cloud server 200. The external auxiliary device 300 may receive an error solution guide from the cloud server 200, and display the same.

According to various embodiments of the present disclosure, a user may accurately identify an error of the image forming apparatus 100. Since it is difficult for a user to identify various types of errors, a cause for error generated may be determined by uploading image data with respect to an output where error has been generated to the remote cloud server 200, and comparatively analyzing an original copy and an output through an algorithm of a determination program of the cloud server 200. The image forming apparatus 100 may enable a user to easily solve a problem by displaying an error solution guide provided from the cloud server 200. Through the process, costs for providing service by a manufacturer may be reduced.

The remote cloud server 200 may conduct problem analysis with respect to an error subject and statistical analysis by cumulatively managing the problems, and thus, a user may focus on a picture quality problem, and perform monitoring in real time. Also, the cloud server 200 may manage a countermeasure for a new problem that has not been found before. Accordingly, a user may promptly respond to a problem occurring in the image forming apparatus 100, and update database of the cloud server 200, thereby performing integrated maintenance of each of the image forming apparatuses 100 without updating them all.

Figure 2:
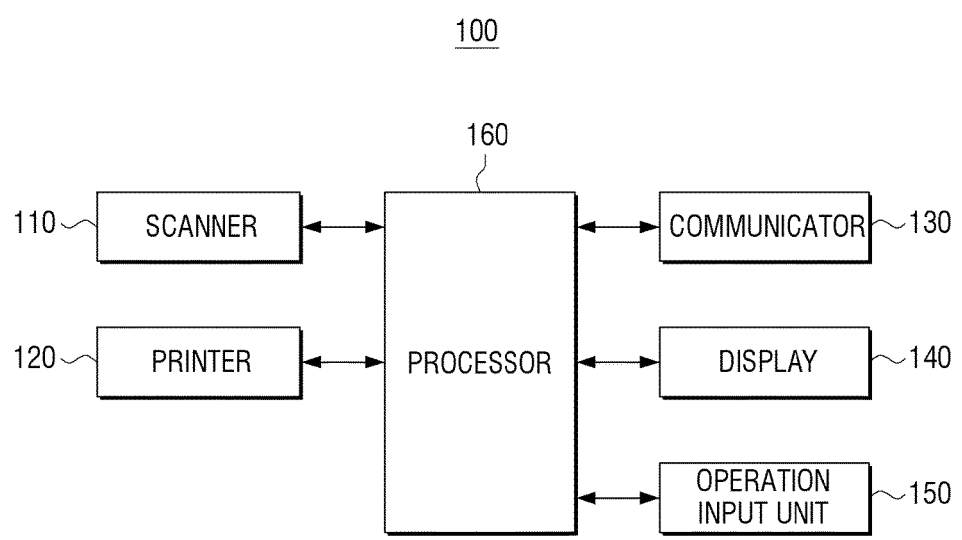
FIG. 2 is a block diagram illustrating a configuration of an image forming apparatus according to an embodiment of the present disclosure.

FIG. 2 is a block diagram provided to explain a configuration of an image forming apparatus 100 according to an embodiment of the present disclosure. The image forming apparatus may be realized as a scanner, a copy machine, a printer, a facsimile, or a multifunction printer (MFP) which comprehensively realizes functions of said devices through one device, etc. Referring to FIG. 2, the image forming apparatus 100 may include a scanner 110, a printer 120, a communicator 130, a display 140, an operation input unit 150, and a processor 160.

However, the image forming apparatus 100 according to an embodiment of the present disclosure is not limited to include all of the above-mentioned configurations. For example, the image forming apparatus 100 according to an embodiment of the present disclosure may not include the communicator 120 or the display 140, and in this example, the embodiments of the present disclosure may be realized using an external auxiliary device 300.

Also, the image forming apparatus 100 may additionally include a configuration not illustrated in the embodiment of FIG. 2. For example, the image forming apparatus 100 may further include a configuration of a storage (not illustrated) which stores print data, etc.

The scanner 110 may scan a script and generate a scan image. The scanner 110 may include a lighting part (not illustrated) which emits light to a script, a lens unit (not illustrated) which images the light reflected from the script to an internal image sensor, and an image sensor, etc., and read image information of the script from the light imaged in the image sensor.

The scanner 110 may be a configuration to scan a script placed on a flatbed, and may be a configuration to scan one side or both sides of a script fed to a duplex automatic document feeding (DADF) apparatus.

The scanner 110 may scan a script a plurality of times. The scanner 110 may quickly pre-scan a script at a low resolution to generate a scan image at low resolution, and subsequently scan the script at a high resolution the second time to generate a scan image.

The printer 120 may print print data. The printer 120 may parse and render a file pre-stored in the storage (not illustrated) or print data received from an external terminal apparatus, to print the same on a printing paper.

The communicator 130 may communicate with a cloud server 200, an external auxiliary apparatus 300, and a terminal apparatus (not illustrated) which transmits print data, etc. For example, the communicator 130 may transmit a scan image, print data, and the like, to the cloud server 200. Also, the communicator 130 may receive an error solution guide, etc., from the cloud server 200.

The communicator 130 may communicate with an external apparatus such as the cloud server 200, via a wired or wireless network. For example, the communicator 130 may use various wireless communication methods, such as near field communication (NFC), wireless LAN, infrared (IR) communication, ZigBee communication, WFi, Bluetooth, and the like. Also, the communicator 130 may use a mobile communication method (for example, GSM, UMTS, LET, WIBRO, and the like). The communicator 130 may use various types of wired communication methods, such as high definition multimedia interface (HDMI), low voltage differential signaling (LVDS), local area network (LAN), universal serial bus (USB) stick, and the like.

The display 140 may display various information provided from the image forming apparatus 100. The display 140 may display a user interface window in which various functions provided by the image forming apparatus 100 are to be selected. The display 140 may be realized as a display of various types, such as liquid crystal display (LCD), organic light emitting diodes (OLED), active-matrix organic light-emitting diode (AM-OLED), plasma display panel (PDP), and the like.

The display 140 may be realized as a touch screen which constitutes an interlayer structure with a touchpad, and the touch screen may be configured to detect a position, area, pressure of a touch input. In this example, the display 140 may further perform functions of the operation input unit described below.

The operation input unit 150 may receive a user selection of function and a control command with respect to the corresponding function. In this example, the function may include a print function, a copy function, a scan function, a fax transmission function, etc. The operation input unit 150 may receive inputs through a control menu displayed on the display 140.

For example, the operation input unit 150 may receive a user selection of an error area. A user may select a part of a scan image where error has occurred in the operation input unit 150. Also, the processor 160 may control the communicator 130 to transmit the selected error area to a cloud server 200 along with the scan image.

As another example, the operation input unit 150 may receive a user selection of a masking area. A user may select an area including sensitive information which should be confidential, such as social security number, bank account number, ID, and password, as a masking area in the operation input unit 150. The processor 160 may delete information in a part of a scan image that corresponds to the selected masking area.

As another example, the operation input unit 150 may receive a user selection associated with feedback information. The operation input unit 150 may receive feedback information on whether an error solution guide provided from the cloud server 200 is of help to solve an error occurred in the image forming apparatus 100. The processor 160 may control the communicator 130 to transmit feedback information regarding which of a plurality of error solution guides solved the error, as to whether the error has been resolved, and etc., to the cloud server 200

The operation input unit 150 may be realized as a plurality of buttons, a keyboard, a mouse, etc., and may also be realized as a touch screen capable of performing the above-mentioned functions of the display 140.

The processor 160 may control the other configurations of the image forming apparatus 100. For example, the processor 160 may control the communicator 130 to transmit at least one of a scan image and print data to the cloud server 200. Also, the processor 160 may generate additional information including displaying of an error area, whether masking has been performed with respect to sensitive information, and control the communicator 130 to transmit the generated information to the cloud server 200 along with a scan image, etc.

As another example, when an error solution guide is received from the cloud server 200, the processor 160 may control the display 140 to display the received error solution guide. The processor 160 may then control the communicator 130 to transmit to the cloud server 200 feedback information as to whether an error occurred in the image forming apparatus 100 has been resolved, using the received error solution guide.

The more detailed operations of the processor 160 will be described below, taken in conjunction with the drawings.

According to an embodiment of the present disclosure, print data corresponding to an original copy or a scan image should be acquired to determine an error occurred in the image forming apparatus 100. The image forming apparatus 100 should acquire a scan image with respect to an output in the case where an error has occurred. When an error has occurred with respect to printing, copying, and scanning, respectively, while the image forming apparatus 100 is in operation, an original image and an error image can be acquired using the methods indicated in Table 1.

TABLE 1

|  | Original image | Error image |
| --- | --- | --- |
| Print Error | Original file (print data) | Scan or photographed image with respect to an output |
| Copy Error | Scan or photographed image with respect to a script | Scan or photographed image with respect to an output |
| Scan Error | Scan or photographed image with respect to a script | Scan file (scan image) |

The processor 160 may control the communicator 130 to transmit at least one of a scan image and print data to a separate account or domain for solving errors provided in the server 200. Also, the processor 160 may control the communicator 130 to transmit additional information along with the images.

Figure 3A:
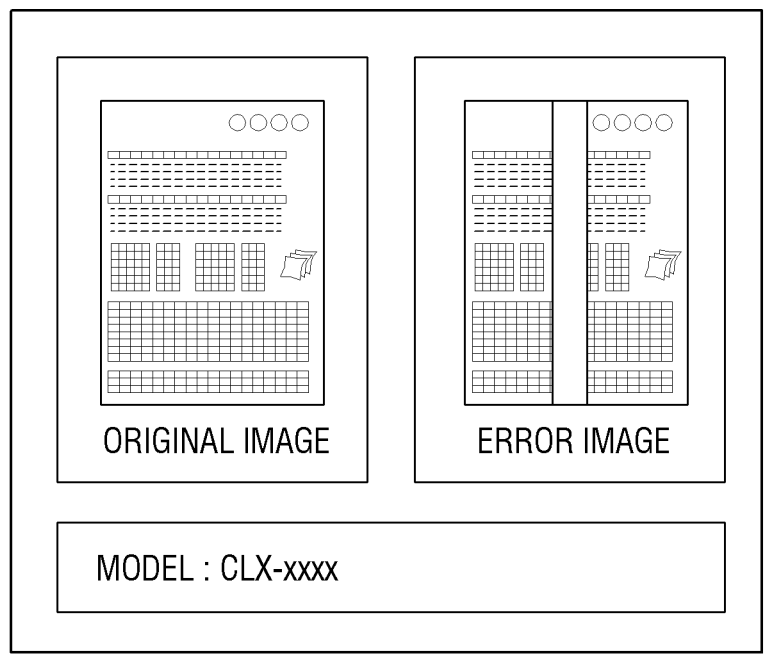
FIGS. 3A and 3B are views illustrating an example of information to be transmitted to a cloud server from an image forming apparatus according to an embodiment of the present disclosure.
Figure 3B:
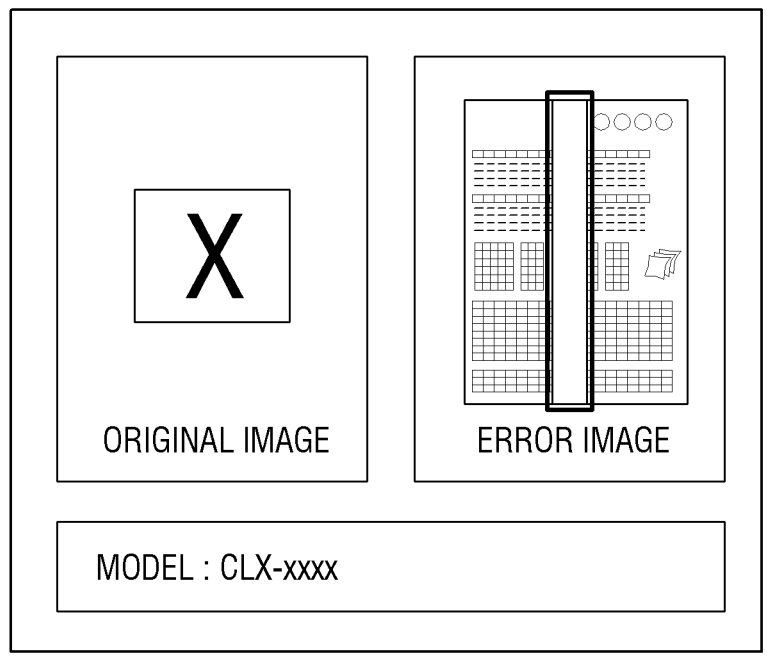

FIGS. 3A and 3B are views illustrating an example of information transmitted to the cloud server 200 from the image forming apparatus 100 according to an embodiment of the present disclosure.

Referring to FIG. 3A, the processor 160 may control the communicator 130 to transmit an original image, an error image and additional information, such as a model name of the image forming apparatus, to the cloud server 200. As for print error, the processor 160 may control the communicator 130 to transmit to the cloud server 200 print data corresponding to an original image and a scan image with respect to an output corresponding to an error image.

Referring to FIG. 3B, the processor 160 may control the communicator 130 to transmit an error image, displaying of a position of area in which an error has occurred, and additional information to the cloud server 200. For example, when a scan error has occurred, the image forming apparatus 100, itself, may only acquire a scan image corresponding to an error image. Thus, the processor 160 may control the communicator 130 to only transmit the error image without transmitting an original image.

When transmitting an error image only, the processor 160 may control to transmit the error image along with additional information which displays a position of error, to enable the cloud server to perform error analysis.

The information on specification of the image forming apparatus 100, such as a model name, may be transmitted to the cloud server 200 together with the error image, with no need to receive additional input. However, when an image is transmitted to the cloud server 200 by way of an external auxiliary apparatus 300, information on specification of the image forming apparatus 100 where an error (e.g. an error in model name) has occurred needs to be received.

Figure 4A:
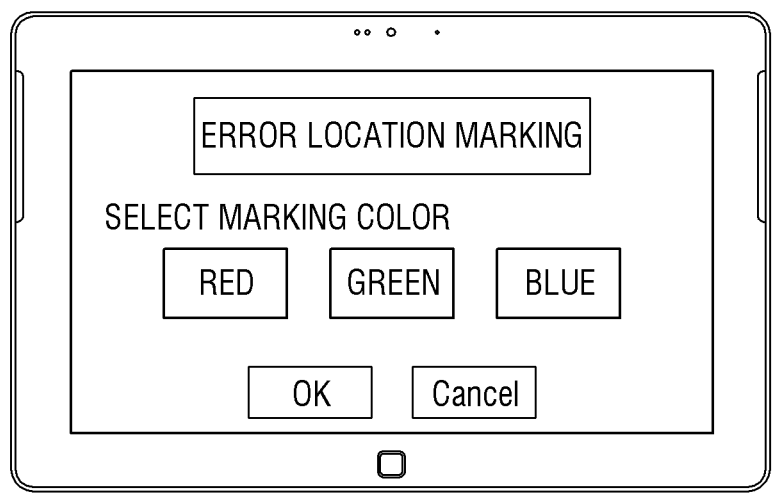
FIGS. 4A and 4B are views provided to explain a user interface (UI) that receives a selection of an error area from an image forming apparatus according to an embodiment of the present disclosure.
Figure 4B:
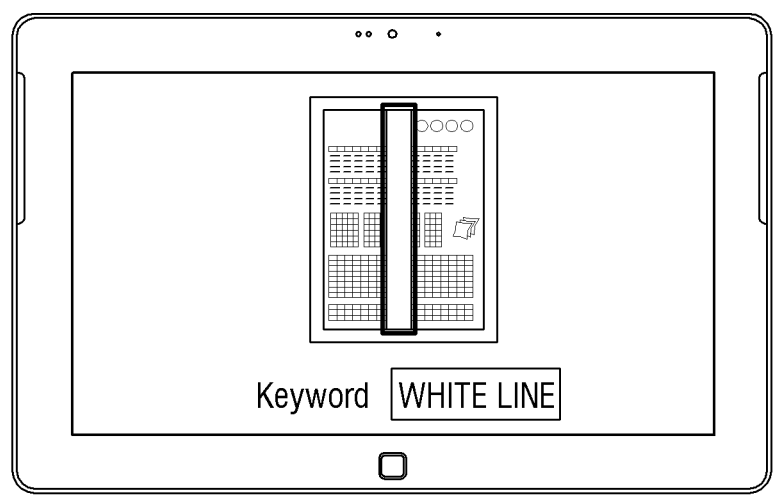

FIGS. 4A and 4B are views provided to explain a user interface (UI) in which a user may select an error area of the image forming apparatus 100, according to an embodiment of the present disclosure. According to an embodiment of the present disclosure, the operation input unit 150 may receive an error area, a keyword, etc. The operation input unit 150 may, as illustrated in FIGS. 4A and 4B, be realized in the form of a touch screen in combination with the display 140. The processor 160 may control the communicator 130 to transmit a scan image to the cloud server 200 along with an error area selected through the operation input unit 150.

The processor 160 may control the display 140 to display a UI in which a user may input a part where error has occurred. Referring to the UI illustrated in FIG. 4A, a user may select a marking color to display an error area via the operation input unit 150. Referring to FIG. 4B, the periphery of a white vertical line generated in a scan image corresponding to an error image is indicated by the selected marking color. As in the embodiment of FIG. 4B, the processor 160 may include the selected error area in a scan image, and transmit the scan image to the cloud server. Also, the operation input unit 150 may receive a keyword with respect to the occurred error together with the error area. For example, in FIG. 4B, the input unit 150 may receive a keyword "white line" together with the error area, and the processor 160 may control the communicator 130 to transmit the keyword to the cloud server 200 along with a scan image, etc. The cloud server 200 may more efficiently retrieve an error solution guide with respect to an error occurred in the image forming apparatus 100 through the displayed error area and keyword.

According to an embodiment of the present disclosure, a user may select a masking area in the operation input unit 150. For example, sensitive information, such as personal information and confidential material, is information that should not be exposed. Thus, the processor 160 may perform mask processing with respect to part of a scan image corresponding to the selected masking area. The processor 160 may control the communicator 130 to transmit the masked scan image to the cloud server 200.

Figure 5A:
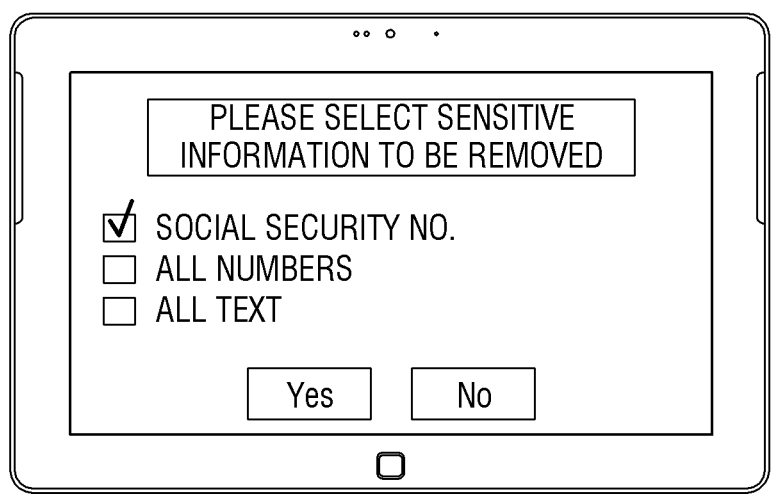
FIGS. 5A and 5B are views provided to explain a UI that receives a selection of a masking area from an image forming apparatus according to an embodiment of the present disclosure.
Figure 5B:
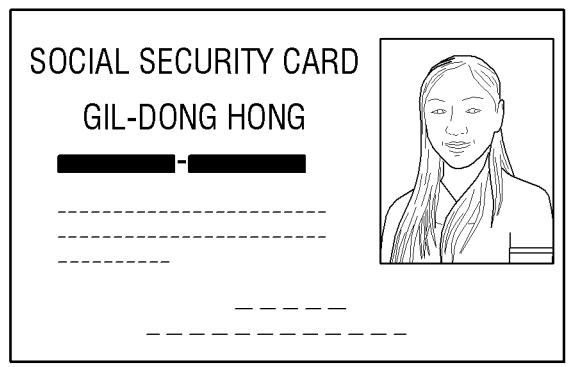

FIGS. 5A and 5B are views provided to explain a UI in which a user selects a masking area in the image forming apparatus 100, according to an embodiment of the present disclosure. The processor 160 may perform an optical character recognition (OCR) with respect to a scan image. Also, the processor 160 may detect an area including predetermined sensitive information based on the OCR result.

For example, the processor 160 may first receive a user selection of sensitive information to be deleted, and then detect an area including the predetermined sensitive information and select the detected area as a masking area.

As another example, the processor 160 may detect at least one sensitive information included in a scan image based on the OCR result. Also, the processor 160 may control the display 140 to display the detected at least one sensitive information. The processor 160 may perform mask processing only with respect to a part corresponding to sensitive information selected from among the displayed at least one sensitive information.

As illustrated in FIG. 5A, the processor 160 may control the display 140 to display a UI to receive a user selection of sensitive information to be deleted. FIG. 5A illustrates a UI in which a user may select at least one of a social security number, a number, and a text to be deleted. As illustrated in FIG. 5A, when the social security number is selected, the processor 160 may perform mask processing with respect to an area where the social security number is positioned, as illustrated in FIG. 5B.

Figure 6:
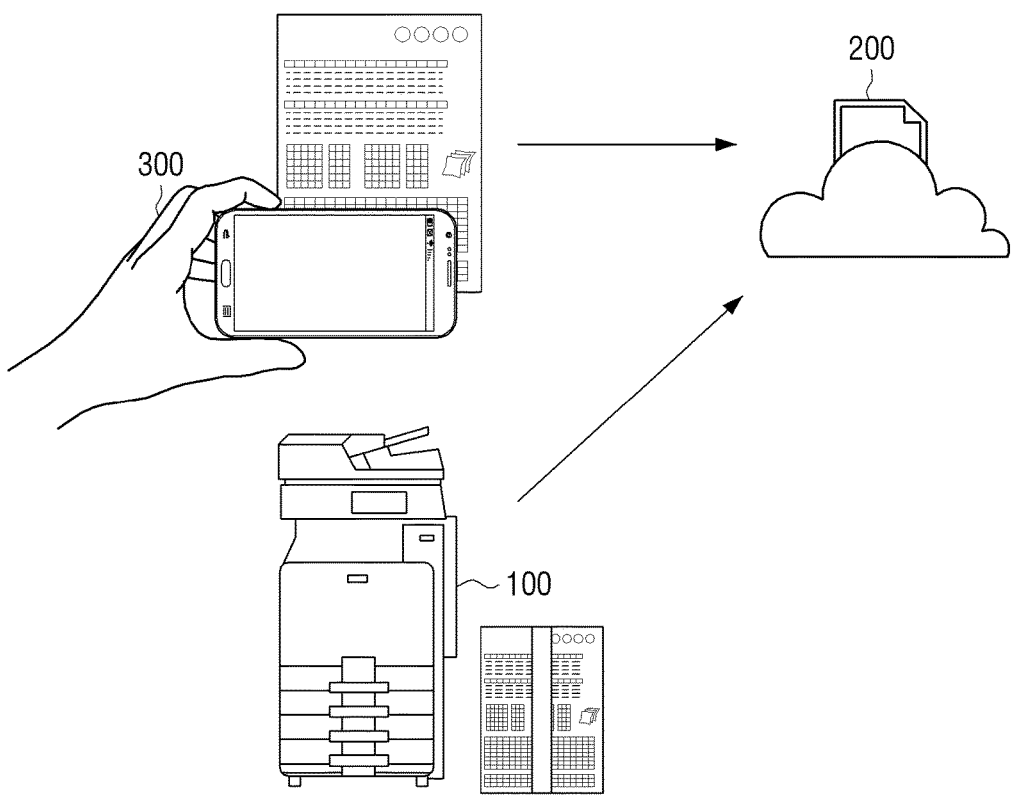
FIG. 6 is a view provided to explain a method for transmitting information on an error of an image forming apparatus by means of an external auxiliary apparatus according to an embodiment of the present disclosure.

FIG. 6 is a view provided to explain a method for transmitting information on an error occurred in an image forming apparatus 100 to a cloud server 200 using an external auxiliary apparatus 300, according to an embodiment of the present disclosure. Although FIG. 6 only illustrates a smartphone having a camera function as the external auxiliary apparatus 300, the external auxiliary apparatus 300 may be realized as an MFP having a scan function, a desktop computer, and etc.

According to an embodiment of the present disclosure, when a scan error occurs in the image forming apparatus 100, the image forming apparatus 100 may only acquire a scan image in which the same error has occurred, even if the apparatus 100 performs scanning with respect to an original image. Thus, an external auxiliary apparatus 300 is required to acquire an image with respect to an original image.

Referring to FIG. 6, a scanner 110 may generate a scan image scanning a script. Also, a vertical white line, which is an error, appears in the scan image. The image forming apparatus 100 may transmit a scan image corresponding to an error image to the cloud server 200.

The external auxiliary apparatus 300 may photograph a script to be scanned, and generate an image corresponding to the original image. The external auxiliary apparatus 300 may transmit the generated original image to the cloud server 200.

In a case of an image photographed by a camera of the external auxiliary apparatus 300, the image may differ from an image scanned in the image forming apparatus 100 in terms of size and rotation, etc. Accordingly, in order to perform error analysis, an image processing with respect to an image photographed by a camera is required. The image processing may be performed in the external auxiliary apparatus 300 and in the cloud server 200 as well.

For example, the image processing may include a crop processing which crops a photographed image to remove areas other than an original image, a perspective correction processing which compensates an image distorted into a trapezoid back to a rectangle, a scaling processing which adjusts a size to be identical to that of a scan image.

According to another aspect of the present disclosure, an external auxiliary apparatus 300 may be used when the image forming apparatus 100 cannot directly communicate with the cloud server 200. When a copy function is performed in the image forming apparatus 100, the external auxiliary apparatus 100 may photograph both a script to be copied and an output, and acquire each of the images. Also, the external auxiliary apparatus 300 may respectively transmit an image corresponding to an original image together with an image corresponding to an error image to the cloud server 200.

Also, in the embodiment where only the external auxiliary apparatus 300 communicates with the cloud server 200, the external auxiliary apparatus 300 needs to transmit additional information on the image forming apparatus 100 where an error has occurred to the cloud server 200. For example, the external auxiliary apparatus 300 may transmit to a model name of the image forming apparatus 100 where an error has occurred, etc., to the cloud server 200 along with a photographed image, etc.

According to an aspect of the present disclosure, the processor 160, when receiving an error solution guide from the cloud server 200, control the display 140 to display the received error solution guide.

The error solution guide may be provided to include at least one of a video clip, an image, a text, etc. Also, the cloud server 200 may determine an error that has occurred in the image forming apparatus 100, and transmit at least one corresponding error solution guide.

Figure 7:
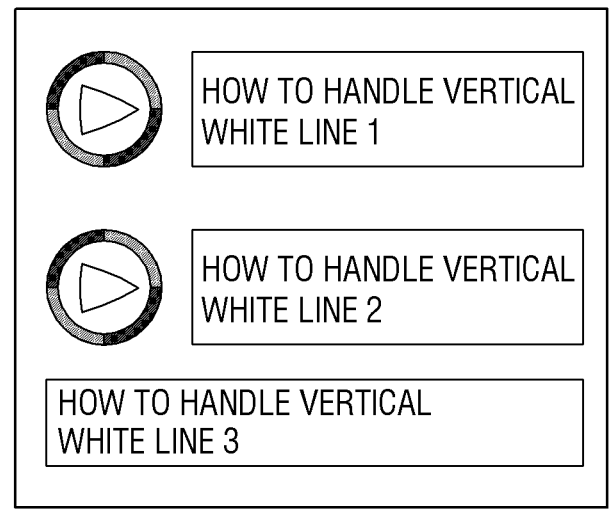
FIG. 7 is a view provided to explain a screen that provides a plurality of error solution guides according to an embodiment of the present disclosure.

Referring to FIG. 7, three error solution guides are received in response to the error "vertical white line". The processor 1610 may control the display 140 to display the received three error solution guides. In the embodiment of FIG. 7, the two upper error solution guides are video clips, and the third error solution guide at the bottom include photos and text in combination.

In a case where the image forming apparatus 100 does not include the display 140, the external auxiliary apparatus 300 may receive and display an error solution guide. The user may solve the errors of the image forming apparatus 100 according to the error solution guide displayed in the external auxiliary apparatus 300.

According to an aspect of the present disclosure, the operation input unit 150 may receive feedback for an error solution guide provided by the cloud server 200. Also, the processor 160 may control the communicator 130 to transmit the input feedback information to the cloud server 200.

Figure 8:
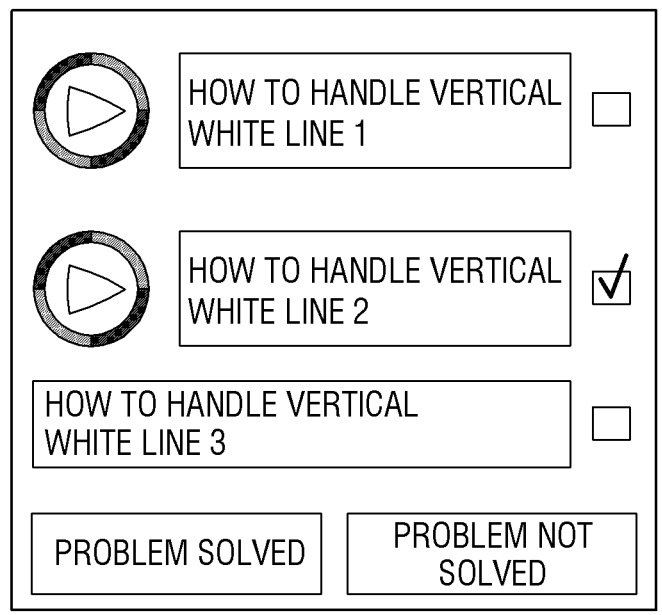
FIG. 8 is a view provided to explain a screen that receives feedback on an error solution guide according to an embodiment of the present disclosure.

For example, the operation input unit 150, when receiving a plurality of error solution guides from the cloud server, receive the most appropriate error solution guide from among the plurality of error solution guides. For example, in FIG. 8, the processor 160 may control the communicator 130 to transmit feedback information that a problem has been resolved to the cloud server 200 using the selected second guide.

As another example, when an error occurred in the image forming apparatus 100 is not resolved by the received error solution guide, the operation input unit 150 may receive feedback information that the occurred error has not been resolved. For example, when the button "problem not solved" is selected, the processor 160 may control the communicator 130 to transmit feedback information that the error has not been resolved by the received error solution guide to the cloud server 200

Figure 9:
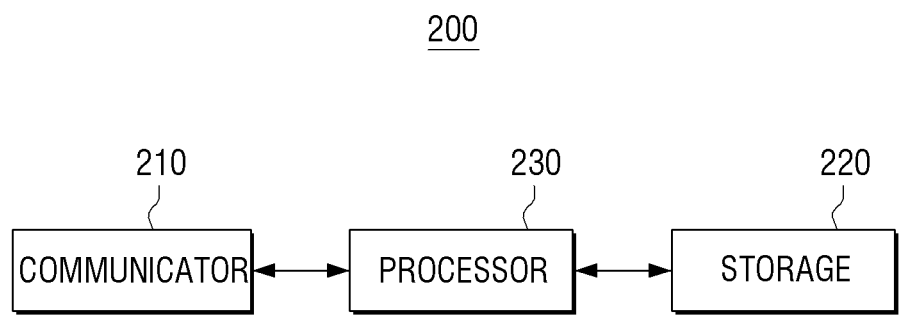
FIG. 9 is a block diagram provided to explain a configuration of a cloud server according to an embodiment of the present disclosure.

FIG. 9 is a block diagram provided to explain a configuration of the cloud server 200 according to an embodiment of the present disclosure. Referring to FIG. 9, the cloud server 200 may include a communicator 210, storage 220, and a processor 230.

The communicator 210 may communicate with the image forming apparatus 100 or the external auxiliary apparatus 300. For example, the communicator 210 may receive a scan image, print data, etc. from the image forming apparatus 100. Also, the communicator 210 may transmit an error solution guide, etc. to the image forming apparatus 100.

The communicator 210 may communicate with an external apparatus, such as the image forming apparatus 100, via a wired or wireless network. For example, the communicator 210 may use various wireless communication methods, such as Near Field Communication (NFC), Wireless LAN (WLAN), InfraRed (IR) communication, ZigBee communication, Bluetooth, etc. Also, the communicator 210 may also use mobile communication methods, such as GSM, UMTS, LET, WiBro, etc. Also, the communicator (210) may use various wired communication methods, such as High Definition Multimedia Interface (HDMI), Low Voltage Differential Signaling (LVDS), Local Area Network (LAN), Universal Serial Bus (USB), etc.

The storage 220 may store a parameter to perform error analysis and a plurality of error solution guides. Also, the storage 220 may store an analysis program used in error analysis. The storage 220 may also temporarily store a scan image, print data, additional information, etc. received from the image forming apparatus 100.

The processor 230 may control the other features of the cloud server 200. For example, the processor 230 may analyze an error, and retrieve an error solution guide corresponding to a plurality of error solution guides stored in the storage 220. Also, the processor 230 may control the communicator 210 to transmit the retrieved error solution guide to the image forming apparatus 100.

The processor 230 may, when receiving a scan image from the image forming apparatus 100 or the external auxiliary apparatus 300, analyze the received scan image, and determine an error. Also, the processor 230 may retrieve at least one error solution guide corresponding to the determined error from among the plurality of error solution guides stored in the storage 220.

The processor 230 may, when finding an error solution guide corresponding to the determined error, control the communicator 210 to transmit the retrieved at least one error solution guide to the image forming apparatus 100.

Also, the processor 230 may, when receiving feedback information regarding whether an error has been resolved by the error resolution guide, update a pre-stored analysis program, an order of providing error solution guides, etc. For example, the processor 230 may store errors that received feedback of "not resolved" in a list of unresolved errors. As another example, the processor 230 may update the analysis program to first provide an error solution guide that was selected to be helpful in resolving the error.

Meanwhile, as a result of error analysis, when a required operation is critical to a system (for example, factory default, ROM upgrade, etc.), the processor 230 may control the communicator 210 to transmit a notification message that an error has occurred in the image forming apparatus 100 to a manager (e.g. service center of a manufacturer), instead of providing an error solution guide.

The processor 230 may compare a security level of the determined error with a preset level, and determine how critical a required operation is to the system. A security level may set for each error solving method according to a risk that it might have on the system.

According to another aspect of the present disclosure, when an error content cannot be determined solely from the analysis of a received error image, the processor 230 may generate a difference image using an original image and an error image. Also, the processor 230 may retrieve a corresponding error solution guide using the difference image.

Figure 10A:
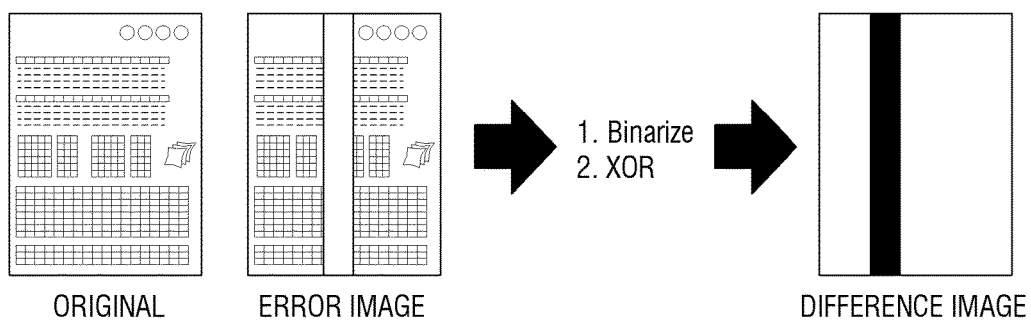
FIGS. 10A and 10B are views provided to explain a cloud server retrieving an error solution guide by means of a difference image according to an embodiment of the present disclosure.
Figure 10B:
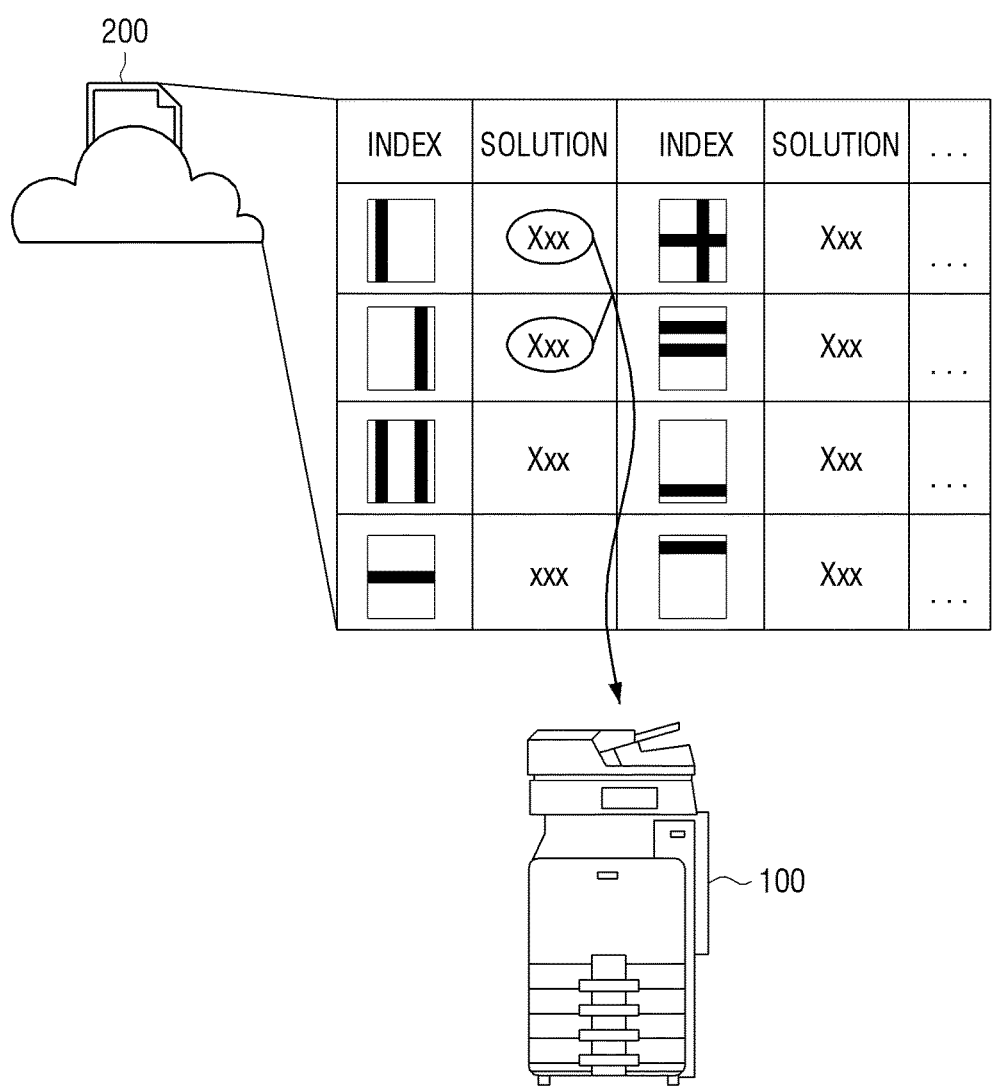

FIGS. 10A and 10B are views provided to explain retrieving an error solution guide in the cloud server using a difference image, according to an embodiment of the present disclosure.

For example, as for a print error, the processor 230 may, when receiving print data (original image) along with a scan image (error image) from the image forming apparatus 100, generate a difference image using the scan image and the print data. As illustrated in FIG. 10A, the processor 230 may binarize the scan image and the print data and then XOR calculate the binarized images, and generate a difference image to only display the part corresponding to the difference between the two images.

Then, the processor 230 may retrieve a difference image in a similar form stored in the storage 220 using the generated difference image. For example, in FIG. 10B, the processor 230 may retrieve the first and second error solution guides which are similar to a difference image having one vertical white line in FIG. 10A. The processor 230 may control the communicator 210 to transmit the retrieved two error solution guides to the image forming apparatus 100.

According to another aspect of the present disclosure, when an error occurred in the image forming apparatus cannot be determined by an error image or a difference image, the processor 230 may control the communicator 210 to transmit a test chart to the image forming apparatus. Even after receiving a request for transmitting a test chart from the image forming apparatus 100, the processor 230 may control the communicator 210 to transmit a test chart to the image forming apparatus 100. For example, the transmitted test chart may include a content to accurately determine an error expected. The image forming apparatus 100 may print the test chart, and the processor 230 may receive a scan image with respect to the output, and determine an error occurred in the image forming apparatus 100.

FIG. 11 is a flowchart provided to explain a method for providing a guide of the image forming apparatus 100, according to an embodiment of the present disclosure.

Referring to FIG. 11, the image forming apparatus 100 may generate, in operation S1110, a scan image by scanning a script. Then, the image forming apparatus 100 may transmit the generated scan image to the cloud server 200, and control the cloud server to analyze, in operation S1120, a cause for an occurred error.

In the state that the cloud server 200 analyzed the cause for the error, when receiving, in operation S1230-Y, a corresponding error solution manual, the image forming apparatus 100 may display, in operation S1240 the received error solution guide. A user may directly solve the error occurred in the image forming apparatus 100 using the displayed error solution guide.

Figure 12:
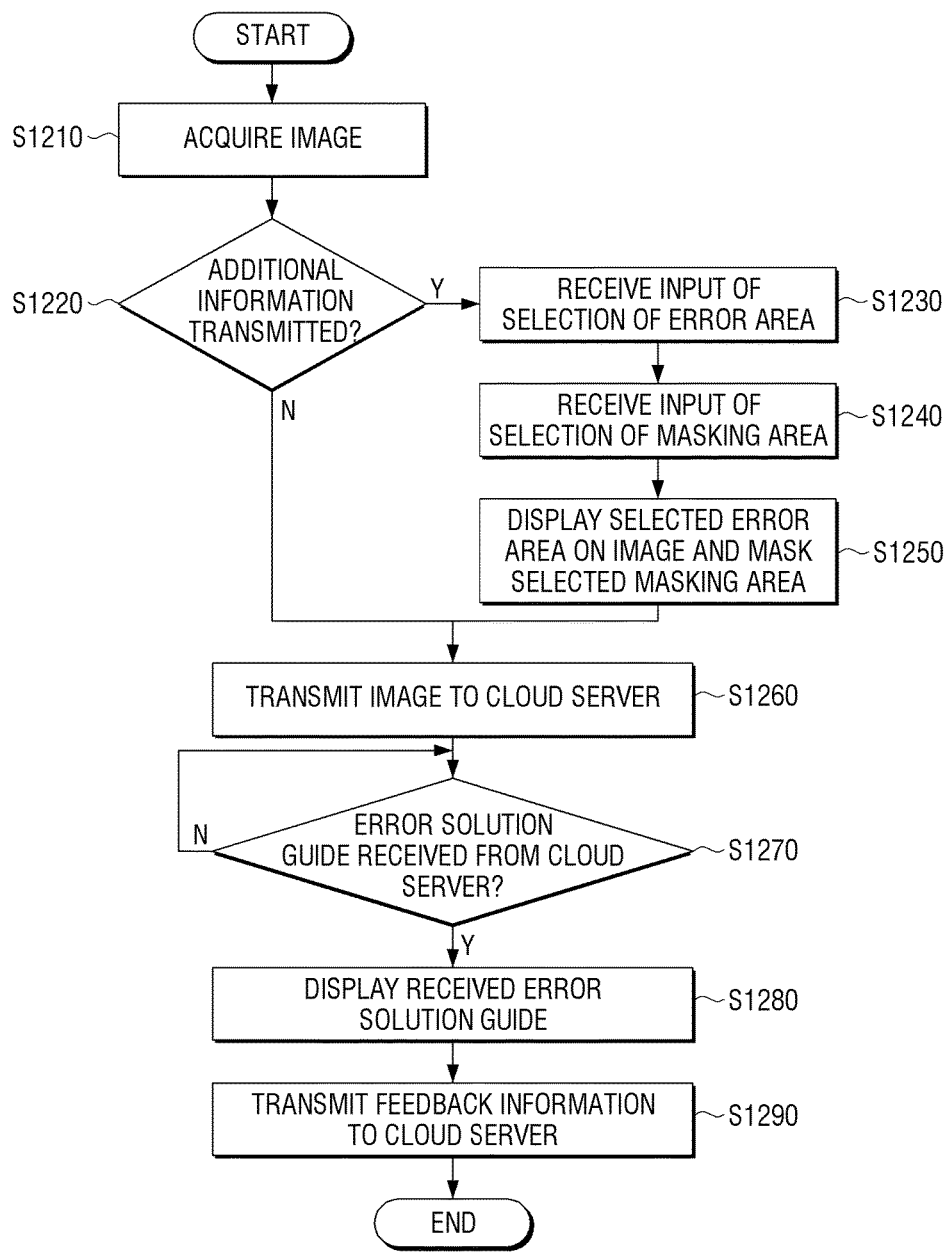

FIG. 12 is a flowchart provided to explain a method for providing a guide by the image forming apparatus 100, according to another embodiment of the present disclosure.

When an error occurs in an output of an image forming apparatus 100, the image forming apparatus 100 may acquire at least one of an original image and an error image in various ways. For example, the image forming apparatus may acquire an image in file, such as print data, and scan a script or an output to acquire a scan image.

The image forming apparatus 100 may transmit, in operation S1220-Y, additional information together with the acquired image. When the image forming apparatus is not transmitting additional information, no to S1220, the image forming apparatus may only transmit the acquired image to the cloud server 200.

When the image forming apparatus is transmitting additional information, yes to S1220, the image forming apparatus 100 may transmit additional information, such as an error area, a masking area, etc., along with the acquired image to the cloud server 200. The image forming apparatus 100 may receive, in operation S1230, a selection of an error where an error has occurred in the acquired error image. Also, the image forming apparatus 100 may receive, in operation S1240, a selection of a masking area. For example, the image forming apparatus 100 may perform OCR with respect to the acquired image. When detecting an area including preset sensitive information (for example, social security number, bank account number, etc.) as a result of OCR, the image forming apparatus 100 may select the detected area as a masking area. Then, the image forming apparatus 100 may display the selected error area on an image, and perform mask processing, in operation S1250, with respect to the selected masking area.

According to another aspect to the present disclosure, the operation of S1230 and the operation of S1240 may be switched, and only part of the operations may be performed. If only part of the operations of S1230 and S1240 is performed, only the corresponding operation of the operation S1250 is performed.

The image forming apparatus 100 may transmit an image including or not including additional information to the cloud server 200. The cloud server 200 may analyze an error occurred in the image forming apparatus 100 based on an image and additional information transmitted from the image forming apparatus 100.

When receiving an error solution guide from the cloud server 200, yes to S1270, the image forming apparatus 100 may display, in operation S1280, the received error solution guide. Also, the image forming apparatus 100 may receive feedback information regarding the error solution guide, and transmit, in operation S1290, the feedback information to the cloud server 200.

For example, when receiving a plurality of error solution guides from the cloud server 200, an image forming apparatus may display the plurality of error solution guides according to a predetermined order. Also, the image forming apparatus 100 may select the most appropriate error solution guide from among the plurality of error solution guides. The image forming apparatus 100 may transmit information regarding the selected error solution guides, and update an analysis program and database of the cloud server 200. Also, the image forming apparatus 100 may transmit feedback information indicating that an error has not been resolved by the provided error solution guide to the cloud server 200.

Figure 13:
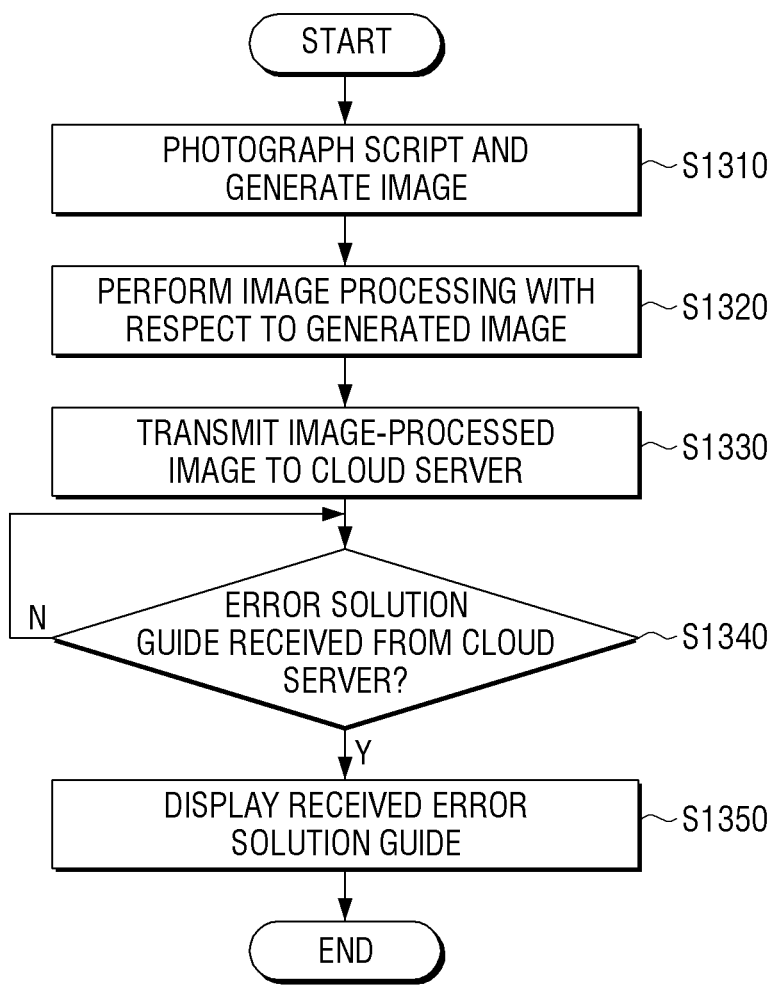
FIG. 13 is a flowchart provided to explain a method for providing a guide with respect to an error in an image forming apparatus by means of an external auxiliary apparatus according to an embodiment of the present disclosure.

FIG. 13 is a flowchart provided to explain a method for providing a guide for an error of the image forming apparatus 100 using an external auxiliary apparatus 300, according to an embodiment of the present disclosure. Although FIG. 13 illustrates an example in which the external auxiliary apparatus 300 includes a camera function, and generates an image by photographing a script, the external auxiliary apparatus 300 may have a scan function, and generate an image by scanning a script.

The external auxiliary apparatus 300 may generate, in operation S1310, by photographing a script. Also, the external auxiliary apparatus 300 may perform image processing with respect to the generated image. The reason is that a photographed image may include a part that is not included in an original copy, and that there may be a rotatably distorted, unlike a scan image or print data.

For example, the external auxiliary apparatus 300 may perform crop processing, perspective correction processing, scaling processing, and the like. The crop processing is to crop a photographed image and remove a region that is not included in an original image. Also, the perspective correction processing is to compensate an image distorted into a trapezoid to a rectangle. Also, the scaling processing is to adjust an image size to be the same as a size of a scan image.

The external auxiliary apparatus 300 may transmit, in operation S1330, an image-processed image to the cloud server 200. In this case, the external auxiliary apparatus 300 may transmit specification information, such as a model name of the image forming apparatus 100 where an error has occurred, together with the image-processed image.

When receiving an error solution guide from the cloud server 200, yes to S1340, the external auxiliary apparatus 300 may display, in operation S1350, the received error solution guide. The cloud server 200 may select a place to receive the error solution guide, and provide the error solution guide to a place which received the image.

Figure 14:
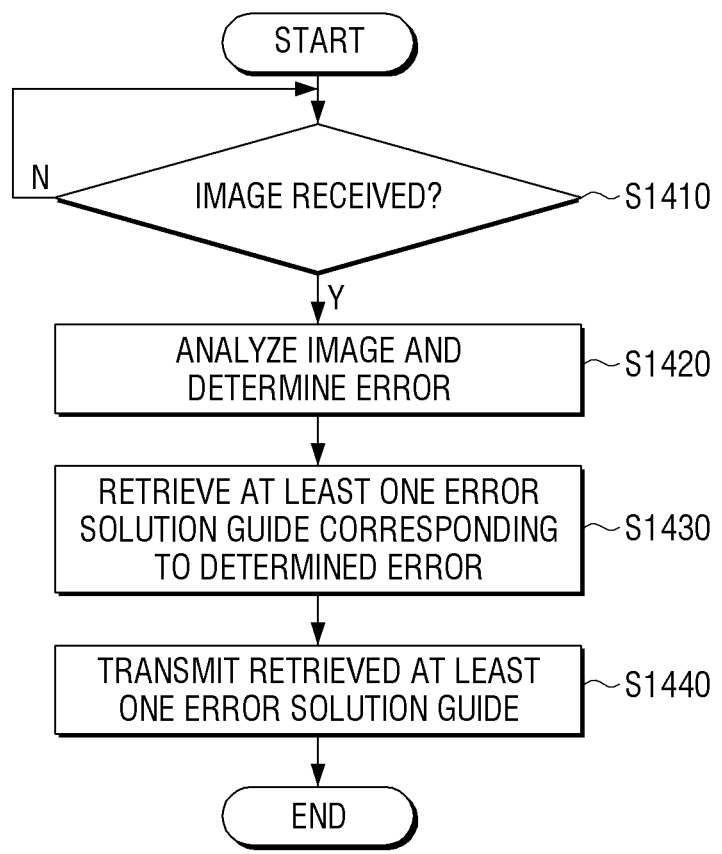
FIGS. 14 and 15 are flowcharts provided to explain an error analysis method of a cloud server according to various embodiments of the present disclosure.

FIG. 14 is a flowchart provided to explain an error analysis method of the cloud server 200, according to an embodiment of the present disclosure.

Referring to FIG. 14, when receiving an image, yes to S1410, the cloud server 200 may analyze the image, and determine, in operation S1420, an error. For example, when receiving a scan image from the image forming apparatus 100, the cloud server 200 may analyze a scan image and determine an error.

Also, the cloud server 200 may retrieve, in operation S1430, at least one error solution guide corresponding to the determined error from among a plurality of pre-stored error solution guides. Also, the cloud server 200 may transmit, in operation S1440, the retrieved at least one of error solution guide. For example, the cloud server 200 may transmit the error solution guide to a place to which the received image is provided. When an image is received from the image forming apparatus 100, the cloud server 200 may transmit an error solution guide to the image forming apparatus 100. When receiving an image from the external auxiliary apparatus 300, the cloud server 200 may transmit the error solution guide to the external auxiliary apparatus 300. Also, an image is transmitted to the cloud server 200 via an e-mail account, the cloud server 200 may transmit the error solution guide to the corresponding e-mail account.

Figure 15:
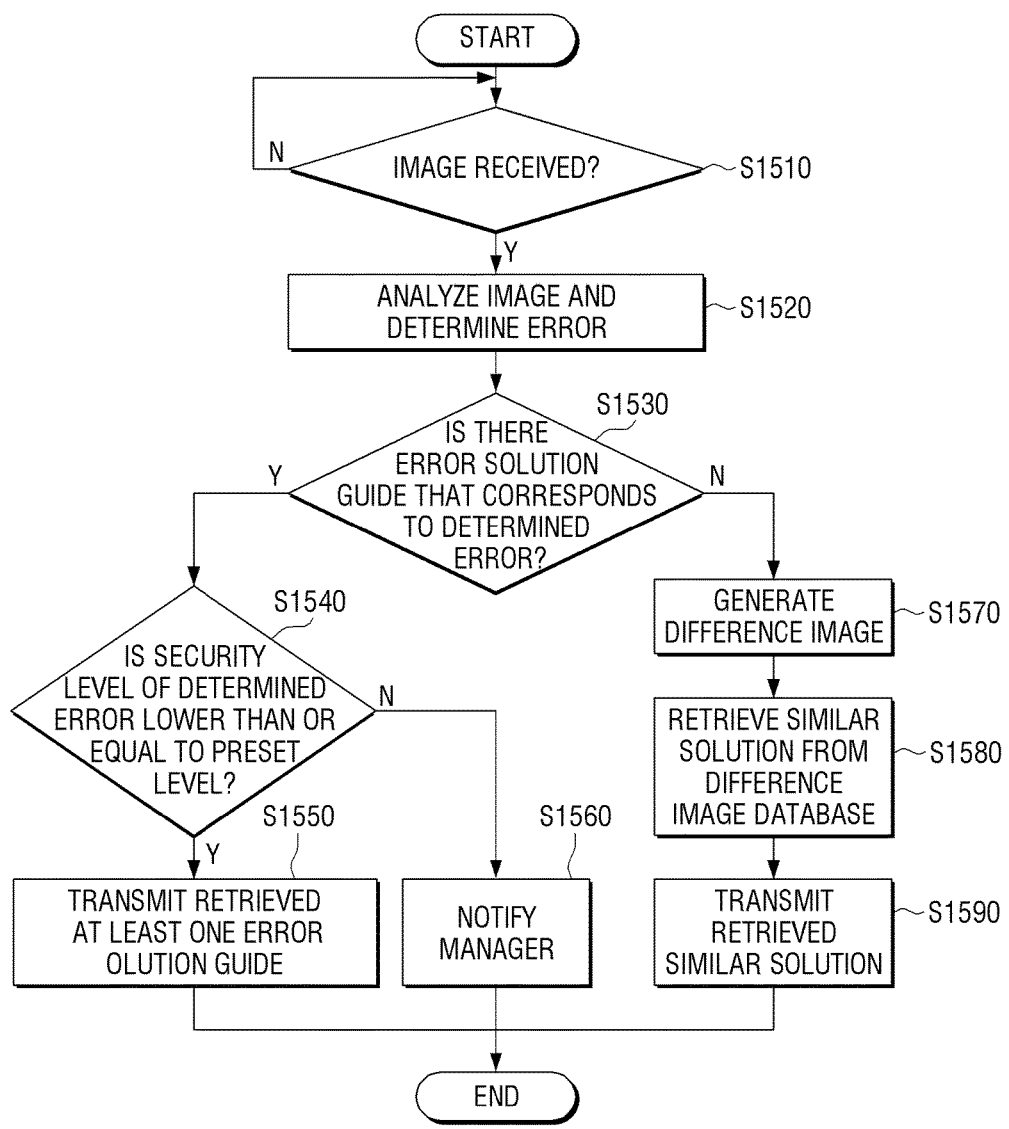

FIG. 15 is a flowchart provided to explain an error analysis method of the cloud server 200, according to another embodiment of the present disclosure. S1510 and S1520 are the same as S1410 and S1420, respectively, and the overlapping description will be omitted.

The cloud server 200 may determine, in operation S1530, whether an error solution guide corresponding to a determined error exists.

If the error solution guide corresponding to the determined error exists, yes to S1530, the cloud server 200 may compare, in operation S1540, a safety level of the determined error with a predetermined level. The safety level is a level which expresses a numerical value as to a critical effect that may be given to a system in an error solving process. For example, In the case of an error solving method requiring factory default, the safety level may be set as the highest safety level.

When a safety level is less than a predetermined level, yes to S1540, the cloud server 200 may transmit, in operation S1550 at least one retrieved error solution guide. If the safety level is less than a preset level, even if a non-professional user directly handles the problem by looking at an error solution guide, it would be unlikely that the user may have a critical influence on the image forming apparatus 100.

When the safety level exceeds a predetermined level, the cloud server 200 may notify a manager, and inform, in operation S1560, the manager that an error has occurred in the image of the image forming apparatus 100. Simultaneously, the cloud server 200 may also transmit a notification message to inform that a request for repair has been received in a service sensor to the image forming apparatus 100.

If no error solution guide is retrieved, no to S1530, the cloud server 200 may retrieve and provide a similar solution. The cloud server 200 may generate, in operation S1570, a difference image using an original image and an error image. For example, the cloud server 200 may binarize an original image and an error image, and perform XOR calculation, to thereby control only an area of difference between the two images to be displayed on the screen.

The cloud server 200 may include a database types of difference images and a solution list mapped to each of the difference image. Using the generated difference image, the cloud server 200 may retrieve, in operation S1580, a similar solution in a difference image database. In addition, the cloud server 200 may transmit, in operation S1590, the retrieved similar solution.

According to the various aspects of the present disclosure, errors of the image forming apparatus 100 may be accurately identified. Since it may be difficult for a user to identify various types of errors, a user may determine a cause for error by uploading image data of an output where an error occurred to a remote cloud server 200, and comparatively analyze an original copy and the output through an algorithm of a determination program in the cloud server. In addition, the image forming apparatus enables a user to easily solve a problem by displaying an error solution guide provided from the cloud server 200.

The remote cloud server 200 may conduct problem analysis with respect to an error subject and statistical analysis by cumulatively managing the problems, and thus, a user may focus on a picture quality problem, and perform monitoring in real time. Also, the cloud server 200 may manage a countermeasure for a new problem that has not been found before. Accordingly, a user may promptly respond to a problem occurring in the image forming apparatus 100, and update database of the cloud server 200, thereby performing integrated maintenance of each of the image forming apparatuses 100 without updating them all.

Also, when it may be difficult to share an error solution with the cloud server 200 by using a function of the image forming apparatus 100, a user may be provided with a solution to an error occurred in the image forming apparatus 100 using the external auxiliary apparatus 300.

Various exemplary embodiments of the above-described methods may be realized in the form of a program command that may be performed through various computer means, and recorded in a non-transitory computer-readable medium.

The computer-readable medium may include a program command, a data file, a data structure, etc., taken alone or in combination. Program commands recorded on the medium may be those that are specially designed and configured for the present disclosure, or may be well known and usable by those skilled in the art in the field of a computer software. The computer-readable recording medium includes, as non-limiting examples, magnetic media, such as a hard disc, a floppy disc, and a magnetic tape, optical media, such as CD-ROM and DVD, magneto-optical media, such as a floptical disc, and a hardware device specially configured to store and perform program commands, such as ROM, RAM, flash memory, etc. Program commands include, as non-limiting examples, not only machine language, as if it were made by a compiler, but also a high-level language code capable of being executed by a computer using an interpreter, etc. The above-described hardware device may be configured to operate as one or more software module to perform operations of the present disclosure, and vice versa.

Although example embodiments of the present disclosure have been illustrated and described, it should be understood that the present disclosure is not limited to the disclosed embodiments and may be variously changed without departing from the spirit and the scope of the present disclosure. Therefore, the present disclosure should be construed as including all the changes, equivalents, and substitutions included in the spirit and scope of the present disclosure.

What is claimed is:

1. An image forming apparatus, comprising:
a scanner to scan a document to generate a scan image of the document;
a transceiver to communicate with a server;
a display to display a screen; and
a processor to:
control the display to display a user interface for a user to select an error area of the scan image, the error area containing an error appearing in the scan image as a result of an error of the image forming apparatus,
receive a selection of the error area input using the user interface,
control the transceiver to transmit the generated scan image and the selected error area to the server, and
in response to receiving an error solution guide related to resolving the error of the image forming apparatus from the server, control the display to display the received error solution guide.

2. The apparatus as claimed in claim 1, further comprising:
a printer to print the document according to data,
wherein the processor is to control the display to display a guide that controls the document printed in the printer to be scanned in the scanner.

3. The apparatus as claimed in claim 2, wherein the processor is to control the transceiver to transmit the data to the server along with the scan image and the selected error area.

4. The apparatus as claimed in claim 2, wherein the data is a second scan image which is generated by scanning a second document.

5. The apparatus as claimed in claim 1, wherein the processor is to, in response to receiving a selection of a masking area:
mask a partial area of the scan image that corresponds to the selected masking area, and
control the transceiver to transmit the masked scan image to the server.

6. The apparatus as claimed in claim 5, wherein the processor is to:
perform an optical character recognition (OCR) with respect to the scan image, and
in response to detecting an area including predetermined sensitive information as a result of the performance of the OCR, select the detected area as a masking area.

7. The apparatus as claimed in claim 1, wherein the processor is to, in response to receiving a plurality of error solution guides of the scan image from the server, control the display to display the plurality of error solution guides.

8. The apparatus as claimed in claim 7, wherein the processor is to, in response to receiving a selection of a most suitable error solution guide from among the plurality of error solution guides, control the transceiver to transmit information on the selected error solution guide to the server.

9. The apparatus as claimed in claim 1, wherein the processor is to:
receive a keyword pertaining to the error appearing in the scan image, and
control the transceiver to transmit the keyword to the server along with the scan image and the selected error area.

10. A method for providing a guide by an image forming apparatus, the method comprising:
generating a scan image of a document by scanning the document with a scanner of the image forming apparatus;
displaying, on a display of the image forming apparatus, a user interface for a user to select an error area of the scan image, the error area containing an error appearing in the scan image as a result of an error of the image forming apparatus;
receiving a selection of the error area input using the user interface;
transmitting the generated scan image and the selected error area to a server; and
in response to receiving an error solution guide related to resolving the error of the image forming apparatus from the server, displaying the received error solution guide on the display of the image forming apparatus.

11. The method as claimed in claim 10, further comprising:
receiving a selection of a masking area; and
masking partial area of the scan image that corresponds to the selected masking area,
wherein the transmitting comprises transmitting the masked scan image to the server.

12. The method as claimed in claim 11, wherein the receiving the selection of the masking area comprises:
performing an optical character recognition (OCR) with respect to the scan image; and
in response to detecting an area including preset sensitive information as a result of the performance of the OCR, selecting the detected area as a masking area.

13. The method as claimed in claim 10, further comprising:
in response to receiving a plurality of error solution guides of the scan image from the server, receiving a selection of a most suitable error solution guide from among the plurality of error solution guides.

14. The method as claimed in claim 13, further comprising:
transmitting information on the selected error solution guide to the server.

15. The method as claimed in claim 10, comprising:
receiving a keyword pertaining to the error appearing in the scan image; and
transmitting the keyword to the server along with the scan image and the selected error area.

* * * * *